No. 835,494. PATENTED NOV. 13, 1906.
G. J. BARRETT.
POINTER FOR TYPE WRITERS.
APPLICATION FILED MAR. 12, 1904.

Glenn J. Barrett,
Inventor

Witnesses
Chas. D. Reeve.
George D. Eaton

UNITED STATES PATENT OFFICE.

GLENN J. BARRETT, OF GRAND RAPIDS, MICHIGAN, ASSIGNOR TO BARRETT TYPEWRITER COMPANY, OF GRAND RAPIDS, MICHIGAN, A CORPORATION OF MICHIGAN.

POINTER FOR TYPE-WRITERS.

No. 835,494.     Specification of Letters Patent.     Patented Nov. 13, 1906.

Application filed March 12, 1904. Serial No. 197,804.

*To all whom it may concern:*

Be it known that I, GLENN J. BARRETT, a citizen of the United States, residing at Grand Rapids, in the county of Kent and State of Michigan, have invented a new and useful Improvement in Pointers for Type-Writers, of which the following is a specification.

My invention relates to improvements in pointers for type-writing machines; and its object is to provide a pointer adapted to swing from a position where it does not contact with the platen and is out of the way normally to a position where it correctly indicates the point upon the platen where the next letter or character will impinge entirely independent of the tilting of said platen or any other motion which it might have.

My invention is more particularly pointed out in the claims hereto, and a structure embodying its mechanical principles is clearly shown in the accompanying drawings, in which—

Figure 1:
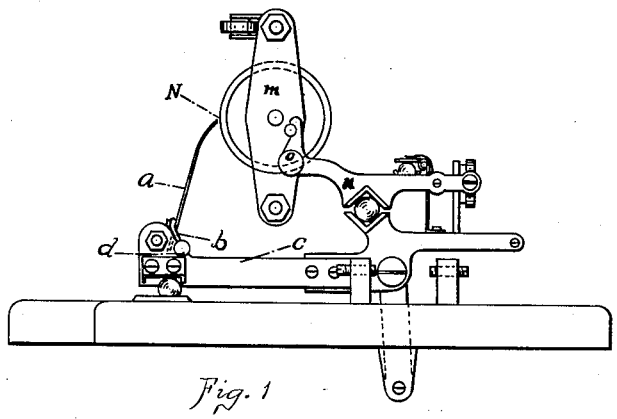
Figure 2:
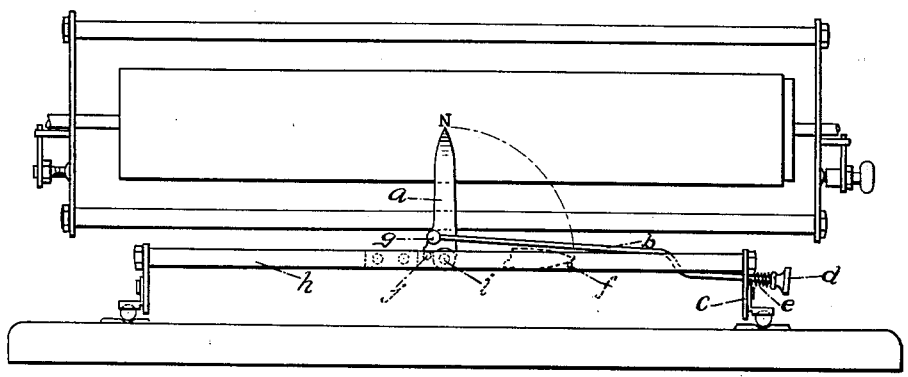
Figure 5:
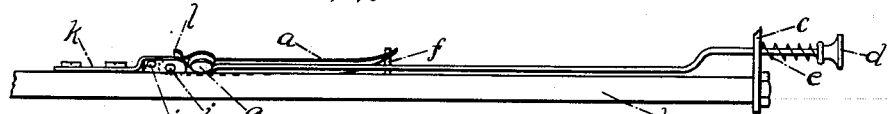
Figure 4:
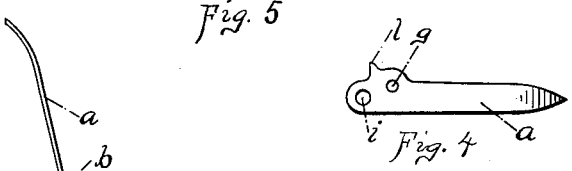
Figure 3:
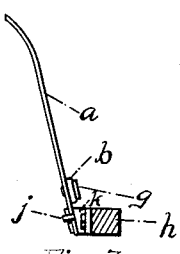

Figure 1 is a side view of my invention, showing a platen pivotally mounted upon a type-writer and the pointer thrown up into operative position. Fig. 2 is a front view of Fig. 1. Fig. 3 is a side view of the pivotal mounting of my pointer, showing a sectional view of the bar $h$, to which the pivotal mounting for my pointer is secured. Fig. 4 is a plan view of my swinging pointer. Fig. 5 is a plan view of my invention, showing the pointer in normal position.

As there is some disadvantage in having a pointer swing to an operative position automatically with the elevation of a tilting platen-carrier, I have made such swinging motion entirely independent of the motion of the platen in a manner which will admit of an adaptation to type-writing machines wherein the platen does not tilt.

By reference to the various figures shown, $a$ is the pointer, pivoted upon the support $k$. Fig. 1 shows a platen in tilted position with the pointer $a$ in a vertical position, N indicating the point upon the platen where the type impinge. It will be noted that the pointer $a$ is pivoted at such an angle that its indicating extremity comes in close proximity to the platen when in position shown in Fig. 1.

The general form of my pointer is shown in Fig. 4, the opening $i$ being for the pivoting-rivet, which attaches it to its support $k$. $g$ is the point at which I prefer to attach the connecting-wire $b$, and $l$ is a projection which comes in contact with the stop-pin $j$ when the pointer is in vertical position.

I have shown the pivotal mounting of my pointer attached to a rod $h$, which forms the forward portion of a frame $c$, in which are suitable ways for the longitudinally-traveling carriage $n$. This frame has a shifting movement back and forth on a type-writer, carrying with it the type-writer carriage and platen for the purpose well known in connection with "shift-key" type-writers.

In Fig. 1, $m$ indicates a platen cradle or carrier pivotally mounted in a carriage $n$ and elevated so as to properly expose to view the point on the platen where the type impinge, (indicated as N.)

By reference to Figs. 2 and 5, $f$ is a stop against which my pointer normally rests. This position is shown by the dotted lines in Fig. 2, the pointer in that position being down flush with the shifting frame upon which it is mounted and out of the way.

Fig. 2 shows a simple manner of connecting my pointer with a finger-button. In this illustration I have shown the push-rod $b$ supported in the frame end $c$. Between the finger-button $d$ and this frame end $c$ I have placed the coil-spring $e$, which serves to pull the pointer away from its vertical position when pressure is taken from the finger-button $d$.

The right hand is used to force the pointer to a vertical position, and with the left hand the carriage-escapement may be released and the carriage moved at will until the pointer indicates to the operator the point upon the platen where he wishes to print the next character. Then pressure is taken from the finger-button $d$ and the pointer returns to normal position, as indicated by the dotted lines in Fig. 2, and the platen may then be lowered into operative position. When the pointer is in the position shown in Fig. 5 and the dotted lines in Fig. 2, it is entirely out of the way and is not liable to damage in making erasures, adjusting paper, cleaning the machine, &c.

I prefer to make the pointer $a$ of some light spring material, so that if for any reason the platen is tilted to operative position before releasing the pointer the latter is not damaged.

In adapting my invention to a type-writer I have herewith shown a form of structure which is not particularly described in or intended as a part of this specification; but What I do claim, and desire covered by Letters Patent, is—

1. In a type-writing machine in combination with a pivoted platen-carrier, the pointer $a$ pivoted at $i$ on the support $k$; the connecting-wire $b$ pivotally attached to said pointer at $g$; the stop $j$; the finger-button mounted upon the connecting-wire $b$; and the spring $e$; the said parts coacting for the purpose specified and substantially as described.

2. In a type-writing machine, in combination with a longitudinally-traveling carriage carrying a tilting platen, a shifting frame, a pointer pivotally mounted upon said shifting frame and adapted to swing from a horizontal position toward a vertical position in the direction of the travel of said carriage, stops for limiting the swinging of said pointer, a push-bar connected to said pointer and extending to one side of the top of the typewriter, a finger-button mounted on said push-bar, and the spring $e$ between said finger-button and said shifting frame, substantially as described.

3. In a type-writing machine in combination with a longitudinally-traveling carriage carrying a tilting platen, a shifting frame, a pointer pivotally mounted upon said shifting frame and adapted to swing from a horizontal position toward a vertical position in the direction of the travel of said carriage, stops for limiting the swinging of said pointer, a push-bar connected to said pointer and extending to one side of the top of the typewriter, and a finger-button mounted upon said push-bar substantially as described.

4. In a type-writing machine in combination with a longitudinally-traveling carriage carrying a tilting platen, a shifting frame, a pointer pivotally mounted upon said shifting frame and adapted to swing from a horizontal, toward a vertical position in the direction of the travel of said carriage, stops for limiting the swinging of said pointer, a finger-button at one side of said type-writer, and a suitable connection between said finger-button and said pointer substantially as described.

In testimony whereof I have signed my name to this specification in the presence of two subscribing witnesses.

GLENN J. BARRETT.

Witnesses:
 CHAS. D. REEVE,
 GEORGE B. EATON.